(12) United States Patent
Salo et al.

(10) Patent No.: US 7,907,971 B2
(45) Date of Patent: Mar. 15, 2011

(54) OPTIMIZED DIRECTIONAL ANTENNA SYSTEM

(75) Inventors: Randy W. Salo, San Diego, CA (US); Bryan G. Moore, Carlsbad, CA (US); Richard H. Clark, Giathersburg, MD (US); Oleg Y. Abramov, St. Petersburg (RU); Alexander N. Kirdin, St. Petersburg (RU); Lev G. Burov, St. Petersburg (RU); Pertti Visuri, Fallbrook, CA (US)

(73) Assignee: Airgain, Inc., Carlsbad, CA (US)

( * ) Notice: Subject to any disclaimer, the term of this patent is extended or adjusted under 35 U.S.C. 154(b) by 432 days.

(21) Appl. No.: 11/209,358

(22) Filed: Aug. 22, 2005

(65) Prior Publication Data

US 2007/0042715 A1 Feb. 22, 2007

(51) Int. Cl.
*H04M 1/00* (2006.01)
(52) U.S. Cl. .... 455/562.1; 455/25; 455/63.4; 455/575.7
(58) Field of Classification Search ............... 455/25, 455/63.4, 562.1
See application file for complete search history.

(56) References Cited

U.S. PATENT DOCUMENTS

| | | | |
|---|---|---|---|
| 2002/0123371 A1* | 9/2002 | Miyoshi et al. | 455/562 |
| 2002/0146983 A1 | 10/2002 | Scherzer et al. | |
| 2003/0048770 A1* | 3/2003 | Proctor, Jr. | 370/349 |
| 2004/0204114 A1* | 10/2004 | Brennan et al. | 455/562.1 |
| 2005/0018634 A1* | 1/2005 | Mantha et al. | 370/334 |
| 2005/0090205 A1* | 4/2005 | Catreux-Erceg et al. | 455/78 |
| 2005/0197162 A1* | 9/2005 | Fujishima et al. | 455/562.1 |

* cited by examiner

*Primary Examiner* — Zhiyu Lu
(74) *Attorney, Agent, or Firm* — Procopio, Cory, Hargreaves & Savitch LLP (57) ABSTRACT

A method of operating a wireless access point having a configurable antenna system includes determining a transmission signal quality metric for a first station with the configurable antenna system in a first configuration, determining a transmission signal quality metric for a second station with the configurable antenna system in the first configuration, determining a transmission signal quality metric for a first station with the configurable antenna system in a second configuration, determining a transmission signal quality metric for a second station with the configurable antenna system in the second configuration, determining a viable set of antenna configurations for which the signal quality metric of each of the stations meets a minimum criteria and configuring the configurable antenna system to a configuration in the viable set when the wireless access point is not transmitting.

21 Claims, 8 Drawing Sheets

OPTIMIZED DIRECTIONAL ANTENNA SYSTEM

FIELD OF THE INVENTION

The present invention relates to wireless communications systems and to a system and method for using a directional antenna system in such systems.

DESCRIPTION OF RELATED ART

Wireless communications systems can facilitate two-way communications between a plurality of customers or stations in a fixed or variable network infrastructure. The wireless communication systems provide communication channels between the stations and their respective base stations or access points in order to connect a station's unit end-user with a fixed-network infrastructure (usually a wire-line system). Standards have been adopted and proposed for certain types of wireless communication systems. For example, the IEEE 802.11 standard defines certain operational aspects of a wireless communication system as does the proposed IEEE 802.16 standard.

SUMMARY OF THE INVENTION

The present invention includes a method, apparatus and system as described in the claims.

Briefly, in one embodiment a method of operating a wireless access point having a configurable antenna system includes determining a transmission signal quality metric for a first station with the configurable antenna system in a first configuration, determining a transmission signal quality metric for a second station with the configurable antenna system in the first configuration, determining a transmission signal quality metric for a first station with the configurable antenna system in a second configuration, determining a transmission signal quality metric for a second station with the configurable antenna system in the second configuration, determining a viable set of antenna configurations for which the signal quality metric of each of the stations meets a minimum criteria and configuring the configurable antenna system to a configuration in the viable set when the wireless access point is not transmitting.

Other embodiments are shown, described and claimed herein.

BRIEF DESCRIPTION OF THE DRAWINGS

These and other aspects, advantages and details of the present invention, both as to its structure and operation, may be gleaned in part by a study of the accompanying drawings, in which like reference numerals refer to like parts. The drawings are not necessarily to scale, emphasis instead being placed upon illustrating the principles of the invention.

DETAILED DESCRIPTION OF THE EMBODIMENTS

After reading this description, it will become apparent to one skilled in the art of how to implement the invention in various alternative embodiments and alternative applications. However, although various embodiments of the present invention will be described herein, it is understood that these embodiments are presented by way of example only, and not limitation. As such, this detailed description of various embodiments should not be construed to limit the scope of breadth of the present invention as set forth in the appended claims.

Those of skill will further appreciate that the various illustrative logical blocks, modules, circuits and algorithm steps described in connection with the embodiments disclosed herein can often be implemented as electronic hardware, computer software, or combinations of both. To clearly illustrate this interchangeability of hardware and software various illustrative components, blocks, modules, circuits and steps have been described above generally in terms of their functionality. Whether such functionality is implemented as hardware or software depends upon the particular application and design constraints imposed on the overall system. Skilled persons can implement the described functionality in varied ways for each particular application, but such implementation decisions should not be interpreted as causing a departure from the scope of the invention. In addition, the grouping of functions within a module, block, circuit or step is for ease of description. Specific functions or steps can be moved from one module, block, or circuit without departing from the invention.

The various illustrative blocks, modules, circuits and algorithms described in connection with the embodiments disclosed herein can be implemented or performed with a general purpose processor, a digital signal processor, an application-specific integrated circuit, a field programmable gate array or other programmable logic device, discrete gates, or transistor logic, discrete hardware components or any combination thereof designed to perform the function described herein. The processor can also be implemented as a combination of computing devices, for example, a combination of a DSP and a microprocessor, a plurality of microprocessors, or one or more microprocessors in conjunction with a DSP core or such other configuration.

The steps and method of algorithm described in connection with the embodiments disclosed herein can be embodied directly in hardware, in a software module executed by a processor, or a combination of the two. The software module can reside, for example, in random access memory, flash memory, read only memory, EPROM memory, EEPROM memory, registers, hard disk, a removable disk, a CD-Rom or other form of storage medium. An exemplary storage medium can be coupled with the processor such that the processor can read information out of and write information to the storage medium. In the alternative, the storage medium can be integral with the processor. The processor and storage medium can reside in an ASIC.

Figure 1:
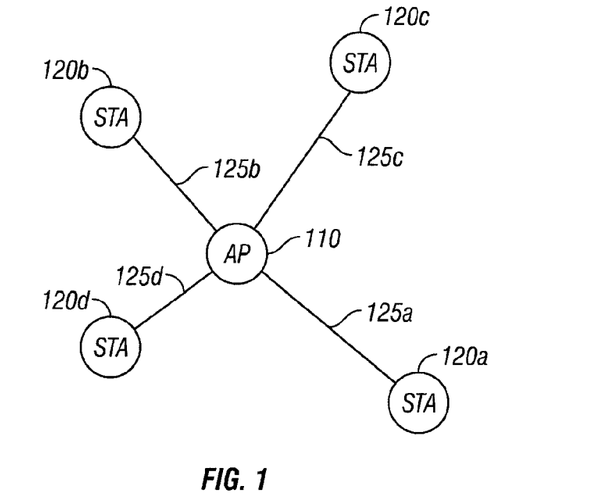
FIG. 1 is a block diagram of a wireless network.

Turning now to FIG. 1, FIG. 1 is a block diagram of a wireless network. The network includes a wireless access point (AP) 110. The wireless access point can be, for example, a wireless router, a cellular telephone base station, or other type of wireless communication device. The access point 110 is typically in communication with a back haul connection. For example, it can be in communication with a digital subscriber line (DSL). The access point can include more than one radio transmitter and more than one radio receiver. In general, an access point has the capability to communicate with more than one other device.

The access point 110 includes a configurable antenna system which can be selectively configured to create different antenna gain patterns (antenna patterns) and/or polarizations. For example, the configurable antenna system can include antennas which can be configured to a discrete number of antenna patterns for each of the radio transmitters and receivers in the access point. Alternatively, the configurable antenna system can be configured to transmit and/or receive in different polarizations. In one embodiment the configurable antenna system can be configured to a discrete number of antenna patterns for each of the radio transmitters and receivers in the access point and to different polarizations. An antenna configuration can include an antenna gain pattern and a polarization. In one embodiment the configurable antenna system includes one or more directional antenna systems which allows the access point to direct or steer the gain of the antenna system (for both transmitting and receiving) in more than one direction or pattern for each of the radio transmitters and receivers. Such types of antenna systems are sometimes referred to as direction-agile antennas. An examples of such an antenna system which can be used with the methods and systems described herein is described in U.S. application Ser. No. 11/104,291, titled SWITCHED MULTI-BEAM ANTENNA, filed Apr. 12, 2005, and U.S. application Ser. No. 11/209,352, titled DIRECTIONAL ANTENNA SYSTEM WITH MULTI-USE ELEMENTS filed concurrently herewith, both of which are hereby incorporated by reference. Alternatively, the access point can include a single radio transceiver in communication with a single directional antenna system.

The wireless network also includes associated clients or stations (STA) 120A-D. Only four stations are depicted in FIG. 1 for ease of description. However, more or fewer stations can be utilized. Each of the stations 120a-d includes one or more antennas for transmitting and receiving wireless signals with the access point 110 via a communication link 125a-d. Though each of the communication links is depicted as a single line, it should be understood that the links can comprise multiple signal paths, multiple frequencies and can be implemented using multiple radios. The stations can employ omnidirectional antennas, directional antennas, or configurable antenna systems such as direction-agile antennas.

The systems and methods described herein can be applied to systems wherein during any one period of time, the access point can either transmit a wireless signal or receive a wireless signal. However, the systems and methods can also be applied to systems that permit simultaneous transmission and reception of wireless signals by the access point and/or the stations. For example, the systems and methods described herein can be applied to systems having multiple simultaneous transmission and reception paths. For example, the systems and methods can be applied to MIMO (multiple-in, multiple-out) systems. MIMO systems utilize multiplexing and other techniques of combining signals to increase wireless bandwidth and range. MIMO algorithms send information out over two or more antennas and the information is received via multiple antennas as well. MIMO systems use the additional pathways to transmit more information and then recombines the signal on the receiving end.

Wireless networks such as the one depicted in FIG. 1 typically operate by the access point transmitting packets of information or data to one of the station 120A-D. The term packet as used herein refers to information transmitted to one or more recipients. The access point may also to occasionally transmit a packet intended for reception by all of the stations (broadcasting). Further, the access point may transmit a packet which is intended for reception by a selected group of the stations (multicasting). Additionally, stations wishing to transmit packets to the access point 110 may do so during defined periods of time while the access point is not transmitting. Such systems typically provide gaps or slots between the transmissions of packets by the access point during which stations wishing to send packets to the access point can transmit. Numerous such protocols have been developed and some have been standardized. For example, IEEE 802.11 and IEEE 802.16 define different protocols for such communication between stations and access points.

The following goals are useful in defining the operation of an access point with a configurable antenna system: (1) During operation of the access point 110 it is desirable that the access point control its configurable antenna system such that it can always receive transmissions (during times when transmissions are expected) from all of the stations in the network. (2) Additionally it is desirable to deliver maximum antenna signal strength (gain) (preferably for both uplink and downlink), however not in such a way that it violates goal #1. (3) Minimize the burden or overhead incurred by the access point in processing the calculations to satisfy goals #1 and #2. We will now describe embodiments for accomplishing those goals.

A viable set of antenna configurations or positions of the configurable antenna system of the access point 110 is defined as the set of possible antenna configurations where all associated stations can be "heard" (during times when transmissions are expected or permitted). By heard, we mean that packets transmitted by the stations can be successfully received by the access point 110. In the system depicted in FIG. 1, each station 120A-D is located in a different direction with respect to the access point and at a different distance. Signal quality metrics are collected for the communication link for each of the stations in all of the possible antenna configurations. It is also possible to collect signal quality metrics for each of the stations in less than all of the possible antenna configurations. In one embodiment the number of possible antenna configurations would depend upon, for example, the configurable antenna system (e.g., a direction-agile antenna) and the configuration of the wireless network. The chart below depicts the signal quality metrics for each of the stations 120A-D in an example where there are 12 possible antenna configurations for the access point 110 depicted in FIG. 1.

| STA Location | Antenna Configuration | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| a | 14 | 8.33 | 8.67 | 7.33 | 7.33 | 13 | 9.33 | 9.33 | 0.0 | 8.33 | 9 | 12 |
| b | 13 | 13.67 | 21.33 | 11.33 | 22.67 | 24.67 | 24 | 20 | 16 | 16.33 | 17.33 | 14.67 |
| c | 16 | 12.68 | 8.33 | 13.67 | 9.33 | 13.33 | 11.33 | 11.33 | 5.33 | 16 | 8 | 18 |
| d | 37 | 38 | 36 | 34 | 31 | 34 | 30 | 34 | 24 | 35 | 34 | 34 |

It should be noted that many factors can affect the signal quality metrics. For example, factors such as distance, reflectance, path, multi-path, interference, weather, moving objects, and fixed objects can all affect the signal quality. Various signal quality metrics or a combination of signal quality metrics can be used. For example, the strength of the signal from a station received at the access point can be used, the signal to noise ration of the signal, error rates and the forward error correction value used (selected) by the radios can also be used. Alternatively or in addition, the signal quality metric can be measured or determined at the station with that information being transmitted to the access point. Because the signal quality metrics can vary over time and can have occasional dramatic swings, in one embodiment the signal quality metric is calculated using a multi-point moving average in order to smooth out temporary dramatic swings. For example, an average calculated over a fixed or varying number of measurements or over a fixed or varying time period can be used. Alternatively, in a simplified approach, the amount of change to the signal quality metric from a new measurement can be limited. For example, no more than a ten percent change per new measurement. This will have an effect similar to a multipoint moving average without the associated memory and processor overhead. The use of the term metric or signal quality metric herein encompasses both a single signal quality metric and a combination of signal quality metrics.

Referring again to the table above, the set of antenna configurations can be reduced by only considering the antenna configurations where all of the stations 120a-d (FIG. 1) have a quality metric above a certain level. The level can be determined collectively or for each station based upon desired network performance and system characteristics. The level can vary by station and can change over time, for example, depending on the quality of service (data rate and/or latency) currently required by or assigned to a station. Additionally, the metric being used can also be changed by station or group of stations over time. For example, such changes could be advantageous due to a change in the network configuration. In the example in the table above, a sufficient quality metric is assumed to be a metric above 0. Therefore, antenna configuration number 9 would not be a member of the viable set (VS) of the antenna configurations. The viable set (all of the antenna positions except for position number 9) can become an exclusive set of antenna configurations to be used for additional performance optimizations. Additionally, a second metric can be used to for one or more of the stations. For example, if signal strength is used as the signal metric to define the viable set, data throughput could be used as a secondary metric for a station with a high data rate requirement, e.g., a television set top box.

Once the viable set has been determined, the access point has three operating states in connection with optimizing the configuration of the configurable antenna system. The first state exists when the access point is about to transmit one or more packets to a station. Prior to the transmission of the packet to a station, the access point looks up the highest quality connection (the highest signal quality metric) within the current viable set to determine which antenna configuration to provides to that station. The antenna is then reconfigured (or remains configured if it is already in that configuration) to that configuration. For example, referring to FIG. 1 and the chart above, this would be antenna configuration 1 for station A, antenna configuration 6 for station B, antenna configuration 12 for station C, and antenna configuration 2 for station D.

Alternatively, the antenna can be configured to a configuration that is not necessarily in the viable set. For example, this would be acceptable if the antenna were to be reconfigured to a configuration within the viable set immediately after a transmission in a configuration not in the viable set was complete. In this embodiment the viable set defines acceptable receiving configurations but does not limit the transmitting positions. This approach permits the use of an antenna configuration that is the best or optimal configuration for transmissions to a station even if that configuration is not in the allowable set.

The next operating state occurs when the access point receives a packet transmitted from one of the stations. Whenever the access point receives a packet from a station, the access point then reconfigures the direction-agile antenna to the configuration which provides the highest quality connection to that station. This is done in anticipation of additional packets being transmitted from that station. However, in wireless networks where stations are assigned specific time periods for transmitting packets to the access point, this operating state would occur during that time, for example, in some IEEE 802.16 implementations. As was noted above, a secondary metric can be used to select or define the configuration from the viable set which provides the highest quality connection to that station.

The next operating state is when the access point is idle. This would occur when no packets are being transmitted between known stations and the access point. In one embodiment, the access point then configures the antenna to the best known resting position from within the viable state. This position can be determined by evaluating the aggregate quality metrics for all known stations and selecting the position where the overall quality of signal received by the access point is the highest. In the chart shown above, the best known resting position for the direction-agile antenna is configuration number 6. Various algorithms or approaches can be used to define the best known resting position. For example, the position can be selected by selecting the position at which no station falls below a minimum threshold. The threshold and metric can vary by station, for example, by taking into account the minimum bandwidth requirements of each station. For example, a station which is receiving a video stream will require a higher bandwidth allocation than a station which is idle. A secondary metric can also be used. The resting position of the antenna can be defined to require a minimum quality metric for the station receiving video which is conducive for video transmission while allowing for a much lower quality metric for a station which is idle. Therefore, it can be advantageous for the resting position to be selected according to current network requirements and characteristics, such as the type of traffic with each station (e.g., video, internet protocol, etc.) and the quality of service (QoS) associated with each station.

In one embodiment, in order to minimize overhead, or burden on the processor(s) of the access point, signal quality metrics can be captured whenever normal traffic occurs between the stations and the access point. Additionally, the access point can "scan" to gather the signal quality metrics needed to fully populate the viable set. A scan can be accomplished by transmitting a message which requests reply or transmission. The frequency of the scanning and which stations are scanned can be selected depending on the characteristics of the wireless network. For example, stations with relatively low signal quality metrics can be scanned more frequently than those with higher signal quality metrics. Additionally, stations with lower traffic rates or with the longest time since traffic has occurred would be the first stations to be scanned. Further, scanning can occur more frequently for the whole system when the signal the signal quality metrics are observed to be changing dramatically and frequently, such as in highly reflective environments, multi-path environments and places with a lot of moving objects. Capturing signal quality metrics during normal traffic can also include configuring the antenna to different acceptable, but not optimal configurations in order to capture signal quality metrics for other configurations and reduce the need for scanning. For example, referring to the chart above, station a could periodically or occasionally communicate for normal traffic in any configuration but configuration 9 in order to capture signal quality metrics for those different configurations even though its optimal configuration in the viable set is configuration 1.

In addition to the configuration of the configurable antenna system of the access point, the power of the signal transmitted by the access point (and the power of the signal transmitted by the stations) can also be varied to optimize the operation of the wireless network. In many wireless networks, improved transmission characteristics allow for higher data transmission rates. For example, IEEE 802.11a and g provide for the transmission of data at various rates using different data encoding mechanisms with different data through put rates, such as OFDM (orthogonal frequency division multiplexing), depending upon the quality of the transmitted signal. Varying the power of the transmitted signal along with the configuration of the configurable antenna system can lead to further optimization of data transmission through the wireless network. For example, the lowest transmission power level which achieves the highest through put can be selected for each station. This approach can decrease interference with other nearby networks. For example, transmitting a signal with a power level greater than necessary to achieve the highest possible bit rate encoding may unnecessarily cause interference with other adjacent or nearby networks. In addition, varying the power of the signal transmitted from the access point can prevent transmitting too strong a signal to a nearby (versus a far away) station which can cause distortion and degrade the signal quality in certain circumstances.

Figure 2:
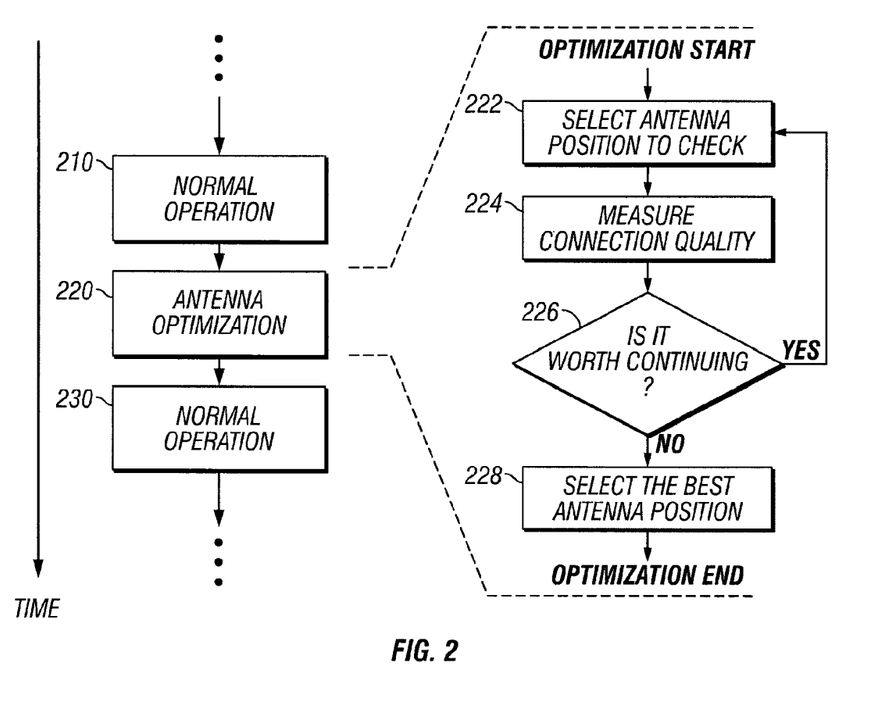
FIG. 2 is a flow chart of a process for operation of an a configurable antenna system.

FIG. 2 is a flow chart of an embodiment of the operation of the access point 110 in regards to optimizing the antenna configuration. As was described above in connection with FIG. 1, an access point can have three operating states that can be considered normal operation in connection with optimizing or selecting the antenna configuration. Those states were described above as the state when the access point is about to transmit a packet to a station, the state when the access point receives a packet from the station and the state when the access point is idle. Those states are encompassed within "normal operation" 210 and 230 in FIG. 2. During certain time intervals, the access point performs the operations which allow it to determine optimal antenna configurations. That process is referred to as antenna optimization which is represented by block 220. The determination of when antenna optimization should be performed is described in more detail below. As is represented in the flow chart of FIG. 2, after antenna optimization 220 is completed, the access point then returns to normal operation 230. Cycling between normal operation and antenna optimization continues on throughout operation of the access point.

Antenna optimization begins by selecting an antenna position or configuration as represented by block 222. The antenna is then set to that configuration and the signal quality metric is measured for one or more transmissions with the antenna in that configuration as represented by block 224. In this step 224, the appropriate power level for transmitting to the station can also be determined. In one embodiment the signal quality metric is measured for a single station by sending a polling request from the access point to a station and receiving the response from the polled station at the access point. Alternatively, the signal quality metric for more than one station can be measured during this step. As represented by decision block 226 the access point then determines whether the process should be repeated for an additional antenna configuration. The criteria for that determination can include, for example, whether packets are backing up for transmission at the access point, the total amount of elapsed time in performing the evaluation, and the relationship of the number of clients and the level of quality metrics already found. As represented by blocks 228, the best position for any of the stations for whom the signal quality metric was measured during the antenna optimization is then re-evaluated based upon the new measurements to identify the best antenna configuration for that station.

Figure 3:
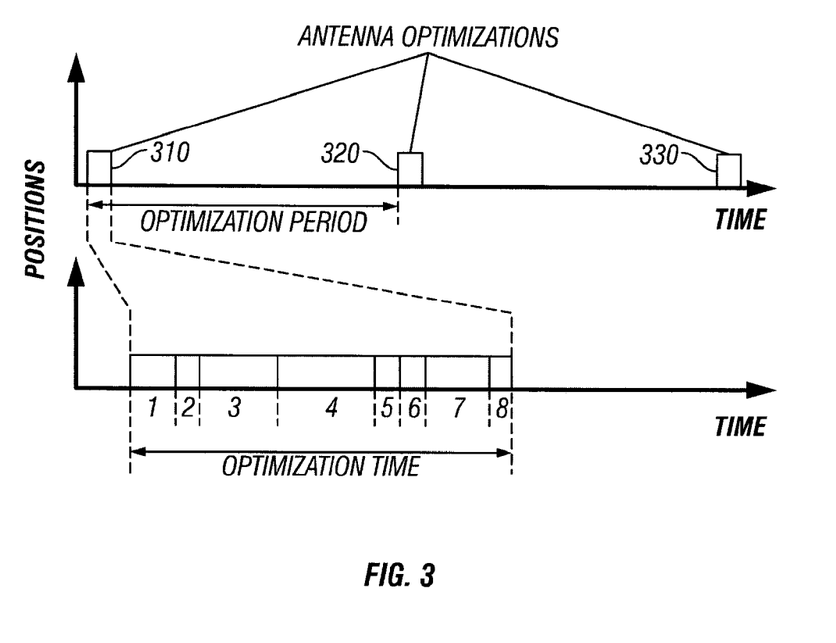
FIG. 3 is a timeline representing the operation of an access point with regard to antenna optimization and normal operation.

FIG. 3 is a timeline representing the operation of an access point, such as the access point depicted in FIG. 1, with regard to antenna optimization and normal operation. Unlike the system depicted in the preceding chart, in the timelines of FIG. 3, the direction-agile antenna only has 8 possible configurations. The antenna optimization process is represented on the upper timeline by time periods 310, 320 and 330. The lower timeline is an expanded view of the time period 310.

During the antenna optimization process regular data traffic is stopped in order not to affect the signal quality metric measurements. This interruption of the data traffic can be considered as overhead introduced by the antenna optimization. The amount of overhead caused by the antenna optimization process depends on the amount of time required to perform the process (duration) and the amount of time between which elapses between repeating the optimization process (period or frequency).

$$\text{Overhead} = \frac{\text{Optimization duration}}{(\text{Optimization period} + \text{duration})} \times 100\%$$

In general, the optimization duration equals the sum of the amount of time required to measure the signal quality metric for each antenna configuration. The duration of the optimization process can vary depending on the number of stations and other factors such as timeouts. A timeout can occur when the access point transmits a request to a station (e.g., a polling request to which a station is expected to respond) and does not receive a response within a predetermined timeout period. In the example depicted in FIG. 3 the time required to measure the signal metric for antenna configurations 1-8 are 3, 2, 4, 5, 2, 2, 4 and 2 milliseconds, respectively. Therefore the antenna optimization process requires 24 milliseconds. If the time between optimization period is four seconds, then the overhead is 24/(4000+24)×100%=0.6% overhead. The optimization duration and the optimization period are adjustable parameters. They can be set and adjusted so that the overhead imposed on the access point will not exceed a desired or selected value.

When an access point has multiple associated stations, in one embodiment the antenna optimization process is performed for only one station during one optimizational period. The antenna optimization process can be performed for each station in turn or according to other criteria, such as more frequently for stations with signals that vary more over time than other stations or less frequently, or not at all for stations with very strong signals.

Figure 4A:
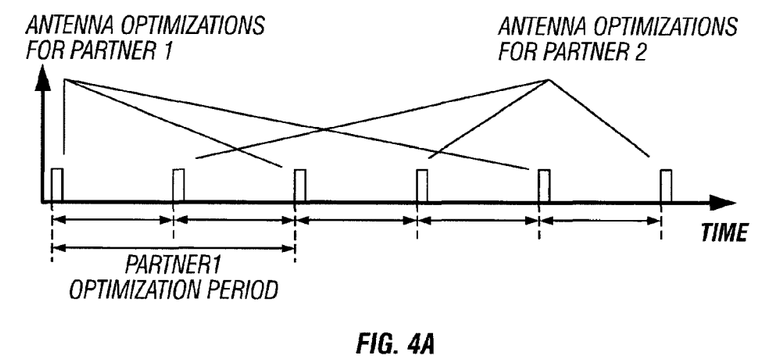
FIGS. 4A and 4B are timelines representing antenna optimizations being performed in a system having two stations in FIG. 4A and for a system having three stations in FIG. 4B.
Figure 4B:
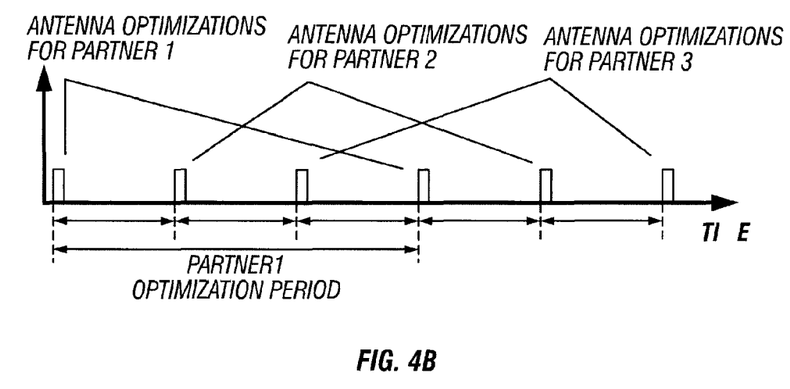

FIGS. 4A and 4B are timelines representing antenna optimizations being performed in a system having two stations in FIG. 4A and for a system having three stations in FIG. 4B. The scale of the two timelines is the same. Comparing FIG. 4A and FIG. 4B makes it quite clear that performing the antenna optimization process for one station per optimization period and performing the optimization for each station in turn causes the optimization period for a single station to increase as stations are added to the wireless network. For example, if the optimization period is two seconds, in the system represented by the timeline of FIG. 4A, the optimization period for each individual station is four seconds. In the system represented by the timeline in FIG. 4B, the optimization period for each station has increased to six seconds.

Therefore, it can be beneficial to take other factors into account when determining which station to perform optimization for. For example, once the antenna optimization process has been determined for all of the stations, an analysis of that data can determine that certain stations are positioned relative to the access point such that their signal quality metric is sufficiently high for all antenna configurations such that the antenna optimization process will not need to be run again for that station, or will only need to be rarely run for that station or can be run when a dramatic decline in the signal quality metric is detected during normal traffic. This approach reduces the number of stations for which the antenna optimization process has to be run on a routine basis and therefore can increase the frequency with which the antenna optimization process is performed on the remaining stations. To further increase the efficiency of the antenna optimization and to therefore decrease the amount of overhead it imposes on the access point, the overall antenna optimization process can further be streamlined by utilizing one or more of the following modifications. The number of antenna configurations measured per optimization process can be reduced by not measuring, or infrequently measuring, positions which have statistically shown low or high metrics. Stations which have been inactive for a predetermined period of time can also be skipped in the optimization process.

Figure 5:
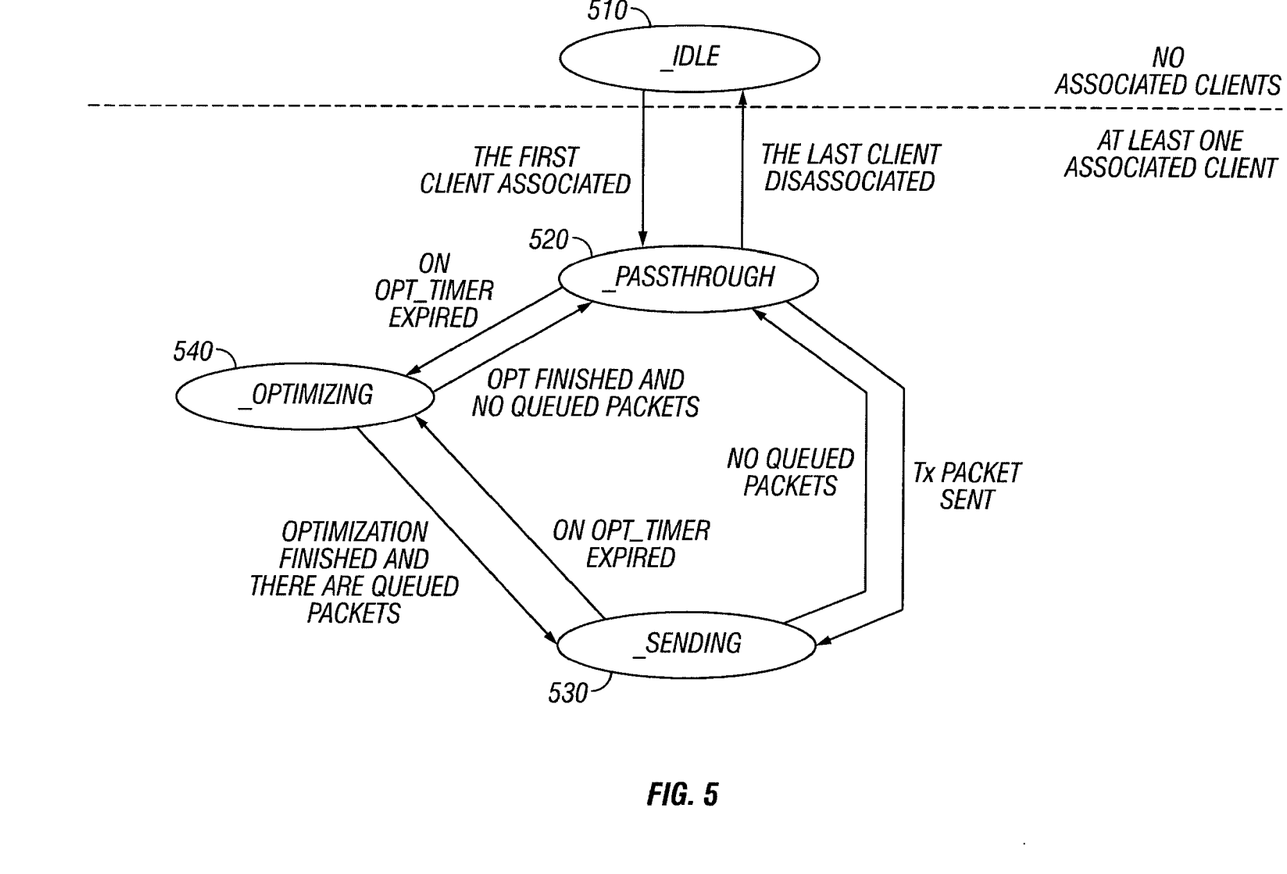
FIG. 5 is a state diagram of the operation of an access point.

FIG. 5 is a more detailed state diagram of the operation of an access point with regard to the configuration of the antenna system. The access point begins in an idle state 510. In the idle state 510 no stations have yet been associated or registered with the access point. For example, this state would occur when an access point is first initialized. When the access point is in the idle state 510, it continuously scans through each of the available antenna configurations. For example, it can configure the antenna system to each of the available configurations for 300 milliseconds per configuration and continue to cycle through those configurations until a station is detected. Alternatively, the antenna system can remain in a single configuration, for example, an omni-directional configuration, until a station is detected.

Once the first station is detected and becomes associated or registered with the access point, the access point transitions to the pass-through state 520. In the pass-through state 520 packets received from the station are processed as follows. All received packets are merely routed on. For example, in the embodiment where the access point is a wireless DSL router, received packets would be transmitted to the DSL connection. The access point does not take into account the optimum configuration for the transmitting station. Alternatively, when a packet is received from a station, the antenna system can then be switched to the configuration which provides the best connection with that station or to the configuration which is defined as the optimum for that station (e.g., taking other factors than the quality of the signal from that station into account).

In the pass-through state 520 packets being transmitted by the access point to a station are handled as follows. When a packet is ready to be transmitted, the antenna system is configured to the configuration which provides the best communication link with that station and the access point transitions to the sending state 530.

In one embodiment when there is only one station associated with the access point, the majority of the time the access point keeps the antenna system in the configuration which provides the best connection with that station. However, because that configuration may impede the ability of other stations to associate or register with the access point, during periods when no packets are being received from the associated station or are being transmitted to the associated station, the access point can be configured to periodically configure the antenna system to one or more different configurations. For example, it can configure a direction-agile antenna to a configuration which provides gain in the direction that is opposite to the configuration of the one associated client.

When the access point is in the sending state 530, all packets received from stations are immediately routed on. Outgoing transmitted packets are treated differently, depending on the nature of the transmission traffic. When there are no queued packets (packets at the access point waiting to be transmitted) and all outgoing packets are directed to the same station, they are sent immediately. As soon as the first packet to be transmitted to another station is detected, the access point begins to queue packets to be transmitted. In one embodiment, a separate queue is established for each station for which transmit packets have been received. Alternatively, the queues can be established based upon antenna configurations. For example, if two stations have the same preferred antenna configuration, their packets would be stored in the same queue. The access point then selects one of the queues for which transmit packets has been received and transmits a predetermined number of those packets. Prior to transmitting those packets, the antenna system is configured to the configuration which is optimal for that station (or stations). As soon as the sending of those packets is completed, the access point selects the next transmit queue for the next station for which packets have been queued and transmits all those packets up to a preset maximum number. In advance of that transmission, the direction-agile antenna is again configured to the configuration which provides the best connection for that station (or stations). This process continues until all of the queued packets have been transmitted.

In addition, in systems that include quality of service (QoS), the access point also takes the QoS associated with the packet and/or a station into account when determining which queue should be transmitted and how many packets in a queue should be transmitted. The access point can also take into account the length of time required to change configuration of the antenna system as part of that process, e.g., can the antenna be reconfigured between the transmission of individual packets without imposing unacceptable performance degradation. In systems with QoS, the access point selects which queue to transmit and how many packets in the queue should be transmitted before moving on to a different queue based upon the QoS scheme of the system. In other words, the optimization of the transmission of packets is dependent upon the QoS associated with the packet.

In addition, the access point can maintain separate queues for multi-casting and for broad casting. Packets which are broad cast (intended to be received by all stations) are kept in a broad cast queue and the antenna system is configured to a position which provides the best overall transmission to all of the stations (e.g., the idle position) when that queue is transmitted. Multi-cast packets are packets intended for selected groups of stations. The antenna configuration for transmitting a multi-cast packet will preferably be one that maximizes the transmission quality for the group on intended recipients. Therefore, the antenna configuration for transmitting a multi-cast packet will depend upon the stations for which packet is intended.

Once all of the queues have been emptied, the access point transitions to the pass-through state 520. When the access point is in the sending state, it periodically determines whether the optimization process should be started. When it determines that that process should be started, it transitions into the optimizing state 540. For example, the optimization can be scheduled to occur on a fixed periodic basis. Alternatively, the time of the optimization process can be dynamic so as to keep the overhead incurred by the optimization process below a pre-determined value.

In the optimization state 540, the access point selects the station for which the optimization process will be performed. Ways in which that determination can be made were described above. The access point then measures the link quality in each of the allowed antenna configurations, recalculates the viable set of antenna positions and determines the best viable position for that station. Then, depending on whether there are outstanding transmit packets, the access point transitions to either the pass-through state or the sending state. While the access point is in the optimizing state, all incoming packets to be transmitted are placed into the queues.

Figure 6:
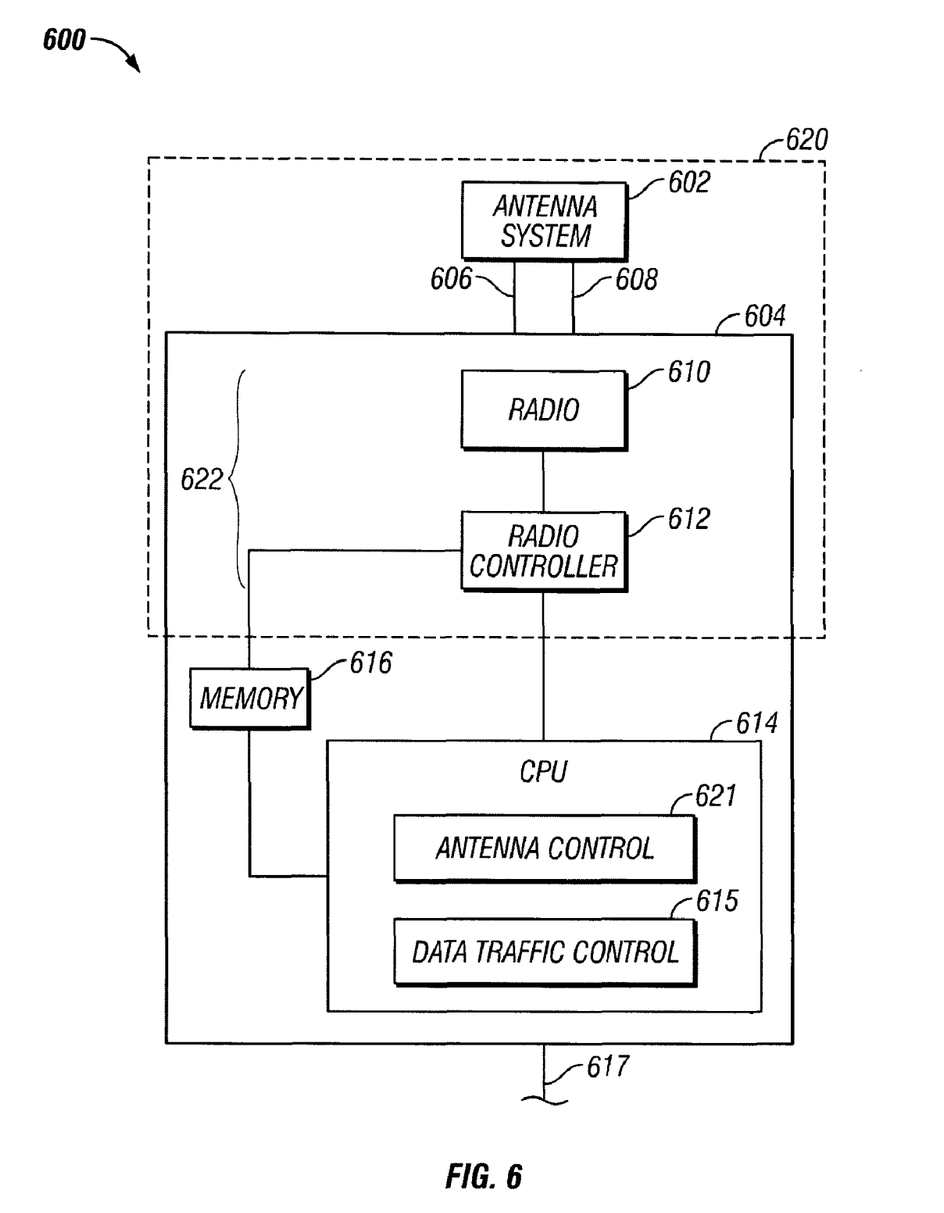
FIG. 6 is a functional block diagram of an example of a wireless communication device.

Turning now to FIG. 6, FIG. 6 is a functional block diagram of an example of a wireless communication device 600. For example, the wireless device can be a wireless router, a mobile access point or other type of wireless communication device. The communication device 600 includes a configurable antenna system 602 which is in communication with a radio system 604. A control line 606 communicatively couples the antenna system to the radio system to provides a path for control signals. A transmit and receive line 608 couples the antenna system and the radio system for the transmission of transmitted and received signals to and from other wireless devices.

The configurable antenna system 602 can be selectively configured to create different antenna configurations including gain patterns and/or polarizations. For example, the configurable antenna system can include antennas which can be configured to a discrete number of antenna patterns. In one embodiment the configurable antenna system 602 includes one or more directional antennas which allows the antenna system to direct or steer the gain of the antenna system (for both transmitting and receiving) in more than one direction or pattern. Examples of such an antenna system which can be used with the methods and systems described herein are described in U.S. application Ser. No. 11/104,291, titled SWITCHED MULTI-BEAM ANTENNA, filed Apr. 12, 2005 and U.S. application Ser. No. 11/209,352, titled DIRECTIONAL ANTENNA SYSTEM WITH MULTI-USE ELEMENTS filed concurrently herewith. Alternatively, the antenna system 602 can be a plurality of switchable omni-directional antennas which can be selectively coupled to the transmit and receive connection 608 of the radio system 604.

The radio system 604 includes a radio transmitter/receiver 610 which is in communication with a radio controller 612. The functions and systems of the radio transmitter/receiver 610 and the radio controller 612 as described herein are also collectively referred to as the radio sub-system 622. The radio generates radio signals which are transmitted by the antenna system and receives radio signals from the antenna system. In one embodiment, the radio system converts received radio signals to digital signals which are passed to the radio controller 612.

The radio controller 612 may implement some or all of the media access control (MAC) functions for the radio system. In general, MAC functions operate to allocate available bandwidth on one or more physical channels on transmissions to and from the communication device. The MAC functions can allocate the available bandwidth between the various services depending upon the priorities and rules imposed by their QoS. In addition, the MAC functions operate to transport data between higher layers, such as TCP/IP, and a physical layer, such as a physical channel. However, the association of the functions described herein to specific functional blocks is only for ease of description. The various functions can be moved amongst the blocks, shared across blocks and grouped in various ways.

The central processing unit (CPU) 614 is in communication with the radio controller 612. The CPU 614 may share some of the MAC functions with the radio controller. In addition, the CPU performs higher level functions which are generally referred to as data traffic control and represented by the data traffic control module 615. Data traffic control can include, for example, routing associated with a data traffic on a back haul connection, such as a DSL connection, and/or TCP/IP routing. A common or shared memory 616 can be accessed by both the radio controller and the CPU. This allows for efficient transportation of packets between the CPU and the radio controller.

In one embodiment control of the antenna system 602 is integrated with the operation of wireless device including the MAC function and QoS (if provided). However, the advantages and benefits of a configurable antenna system can be incorporated into a wireless device with very little integration with such a system. In one embodiment, the radio card (elements in the dashed box 620 in FIGS. 6 and 8) is not modified other than coupling it to a configurable antenna system instead of an omni directional antenna. An antenna control module 621 is included in the CPU 614. The antenna control module determines the desired antenna configuration and generates the control signals to be sent to the antenna system 602. In response to the control signals, the antenna system changes to the desired configuration. In one embodiment the antenna control module is provided with or has access to a signal quality metric for each received signal. The signal quality metric can be provided from the radio 610 or the radio controller 612. As was mentioned above, the signal quality metric can also be measured or determined at the station and transmitted to the device 600. The signal quality metric is used to determine or select the antenna configuration as will be explained more fully below. The antenna control module 621 is provided with direct or indirect communication to the antenna system 602, for example via control line 606. In one embodiment, the antenna control module operates above the MAC layer of the system. The control signals from the antenna control module 621 can be transmitted directly from the CPU to the antenna system 602 or can be transmitted via the other elements of the radio system 604 such as the radio controller 612 or the radio 610. Alternatively, the radio control module 621 can reside on the radio controller 612 or the radio 610. The operation of the radio control module will be described below in more detail with regard to FIG. 8.

The methods described in connection with FIGS. 1-5 can be implemented within various of the functional blocks of FIG. 6. In addition, the methods or functions can be separated into components or modules that are performed by multiple blocks. In one embodiment, the elements within the dashed box 620 in FIG. 6 are a radio card (for example, a WLAN PCI card) which is coupled to the processor by a PCI (peripheral component interconnect) bus.

Figure 7:
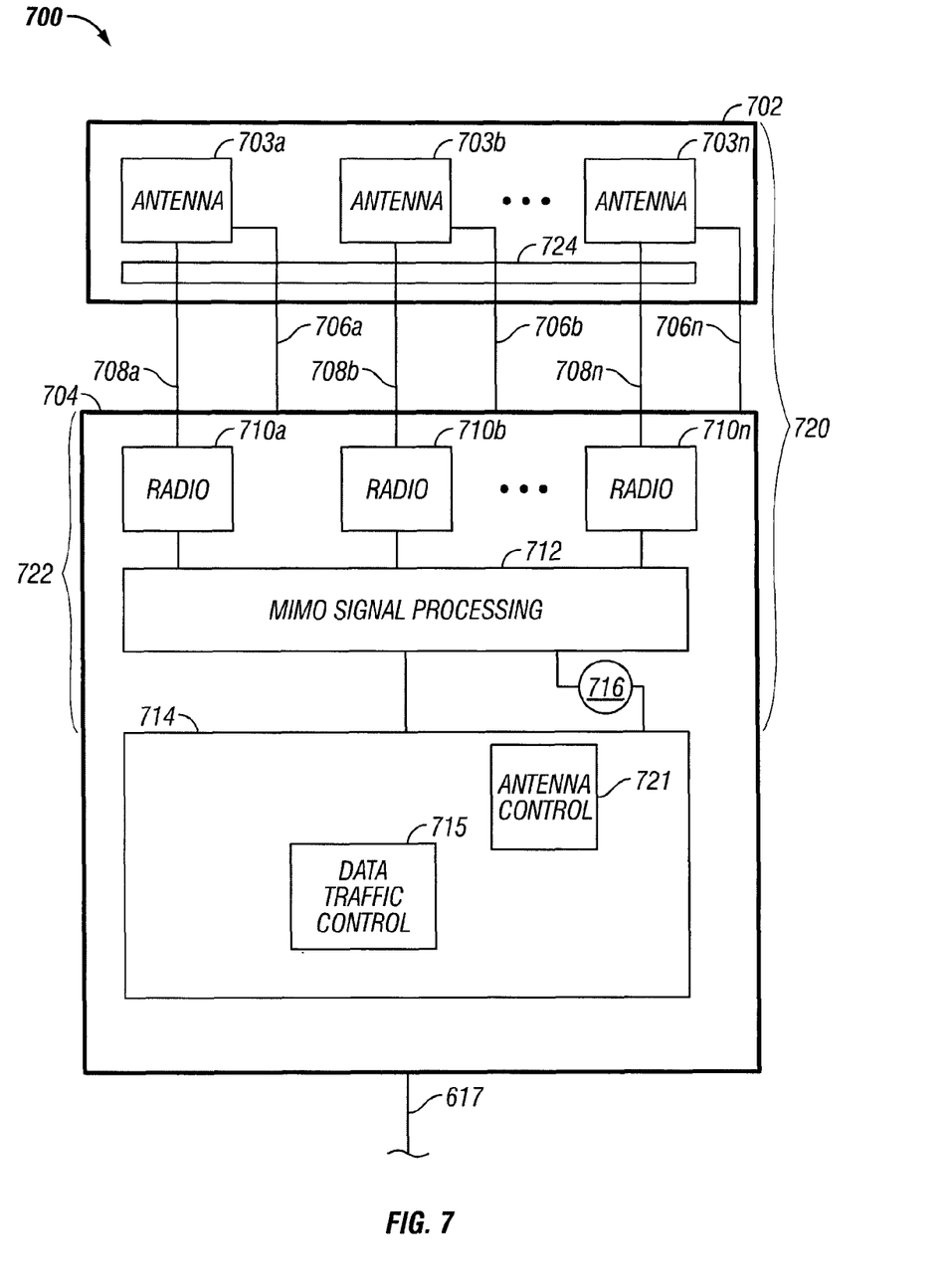
FIG. 7 is a functional block diagram of an alternative example of a wireless communication device 700.

Turning now to FIG. 7, FIG. 7 is a functional block diagram of an alternative embodiment of a wireless communication device 700. For example, the wireless device can be a wireless router, a mobile access point or other type of wireless communication device. In addition, the wireless device 700 can employ MIMO (multiple-in multiple-out) technology. The communication device 700 includes a configurable antenna system 702 which is in communication with a radio system 704. The antenna system includes a plurality of configurable antennas 703*a-n*. Although three configurable antennas are depicted, more or fewer such elements can be used. A plurality of control lines 706*a-n* communicatively couple the antenna system 702 to the radio system 704 to provide a path for control signals for controlling the configurations of the configurable antennas 703*a-n*. A plurality of transmit and receive lines 708*a-n* couples the antenna system and the radio system for the transmission of transmitted and received radio signals. Though the number of transmit and receive lines and the number of control lines depicted corresponds with the number of antennas depicted. However, that is not necessary. More or fewer such lines can be used as can multiplexing and switching techniques. In one embodiment the antenna system includes a controller 724 which receives the control signals and the transmit and receive signals. The controller can route the signals to the appropriate antenna and radio.

The configurable antenna system 702 can be selectively configured in response to control signals to create different antenna configurations which can include different antenna patterns and/or polarizations. In one embodiment the configurable antenna system 702 includes antennas which can be configured to a discrete number of antenna patterns. In one embodiment, the configurable antennas 703*a-n* each includes one or more directional antennas which allows the antenna system to direct or steer the gain of each of the configurable antennas (as well as the overall antenna system) (for both transmitting and receiving) in more than one direction or pattern. An example of such an antenna element which can be used with the methods and systems described herein is described in U.S. application Ser. No. 11/104,291, titled SWITCHED MULTI-BEAM ANTENNA, filed Apr. 12, 2005 and U.S. application Ser. No. 11/209,352, titled DIRECTIONAL ANTENNA SYSTEM WITH MULTI-USE ELEMENTS filed concurrently herewith, referenced above. Alternatively, one or more of the antennas 703*a-n* can be a plurality of omni-directional antennas which can be selectively coupled to the transmit and receive signals of the radio system 704.

The radio system 704 includes a radio sub-system 722. The radio sub-system 722 includes a includes a plurality of radio transmitter/receivers (radios) 710*a-n* and a MIMO signal processing module (the signal processing module)712. The plurality of radios 710*a-n* are in communication with the MIMO signal processing module. The radios generate radio signals which are transmitted by the antenna system 702 and receive radio signals from the antenna system. In one embodiment each configurable antenna 703*a-n* is coupled to a single corresponding radio 710*a-n*. Although each radio is depicted as being in communication with a corresponding antenna element by a transmit and receive line, more or fewer such lines can be used. In addition, in one embodiment the radios can be controllably connected to various ones of the antennas by multiplexing or switching.

The signal processing module 712 implements the MIMO processing. MIMO processing is well known in the art and includes the processing to send information out over two or more radio channels on two or more antennas and to receive information via multiple radio channels and antennas as well. The signal processing module can combine the information received via the multiple antenna into a single data stream. The signal processing module, like the radio controller 612 of FIG. 6, may implement some or all of the media access control (MAC) functions for the radio system and control the operation of the radios so as to act as a MIMO system. A description of the MAC functions was provided in connection with FIG. 6 and will not be repeated here. The association of the functions described herein to specific functional blocks in the figure is only for ease of description. The various functions can be moved amongst the blocks, shared across blocks and grouped in various ways.

A central processing unit (CPU) 714 is in communication with the signal processor module 712. The CPU 714 may share some of the MAC functions with the signal processing module 712. In addition, the CPU can include a data traffic control module 715 which performs the same functions as the data traffic control module 615 described in connection with FIG. 6. A common or shared memory 716 which can be accessed by both the signal processing module and the CPU can be used. This allows for efficient transportation of data packets between the CPU and the signal processing module.

In one embodiment an antenna control module 721 is included in the CPU 714. The antenna control module determines the desired configuration for each of the antenna 703*a-n* and generates the control signals to be sent to the antenna system 702. In one embodiment, the antenna control module 721 operates above the MAC layer of the system. In response to the control signals, the configuration of one or more of the antennas is changed. In one embodiment, all of the antennas are configured in the same manner. For example, all of the antennas can have their gain maximized in the same direction. Alternatively, each antenna can be individually configured. Further, the antennas can be configured into predetermined configurations. For example, one of the antennas can be configured to provide maximum gain in a primary direction and the other antennas can be configured for maximum gain in a direction that is a predetermined offset from the primary direction.

The antenna control module 721 can be provided with direct or indirect communication to the antenna system 702, for example via control lines 706*a-n*. More or fewer control lines than those shown can be used. The control signals from the antenna control module 721 can be transmitted directly from the CPU to the antenna system 702 or can be transmitted via the other elements of the radio system 704 such as the signal processing module 712 or the radios 710a-n. Alternatively, the antenna control module 721 can reside on the signal processing module 712 or in one or more of the radios 710a-n.

In one embodiment the antenna control module 721 is provided with or has access to a signal quality metric for each received signal and/or transmitted signal on a communication link. The signal quality metric can be provided from the MIMO signal processing module 712. The MIMO signal processing module has the ability to take into account MIMO processing before providing a signal quality metric for a communication link between the wireless communication device 700 and a station. For example, for each communication link the signal processing module can select from the MIMO techniques of receive diversity, maximum ratio combining, and spatial multiplexing each. The signal quality metric received from the signal processing module, for example, data through put or error rate, can vary based upon the MIMO technique being used. A signal quality metric, such as received signal strength, can also be supplied from one or more of the radios 710a-n. However, the radios would not take into account MIMO techniques, such as spatial multiplexing. The signal quality metric is used to determine or select the antenna configurations as described herein.

The methods described in connection with FIGS. 1-5 can be implemented within various of the functional blocks of FIG. 7, for example, in the signal processing module or the CPU. In addition, the methods or functions can be separated into components or modules that are performed by multiple blocks depicted in FIG. 7. In one embodiment, the elements indicated as 720 in FIG. 7 are implemented as a radio card (for example, a MIMO WLAN PCI card) which is coupled to the processor by a PCI (peripheral component interconnect) bus.

Figure 8:
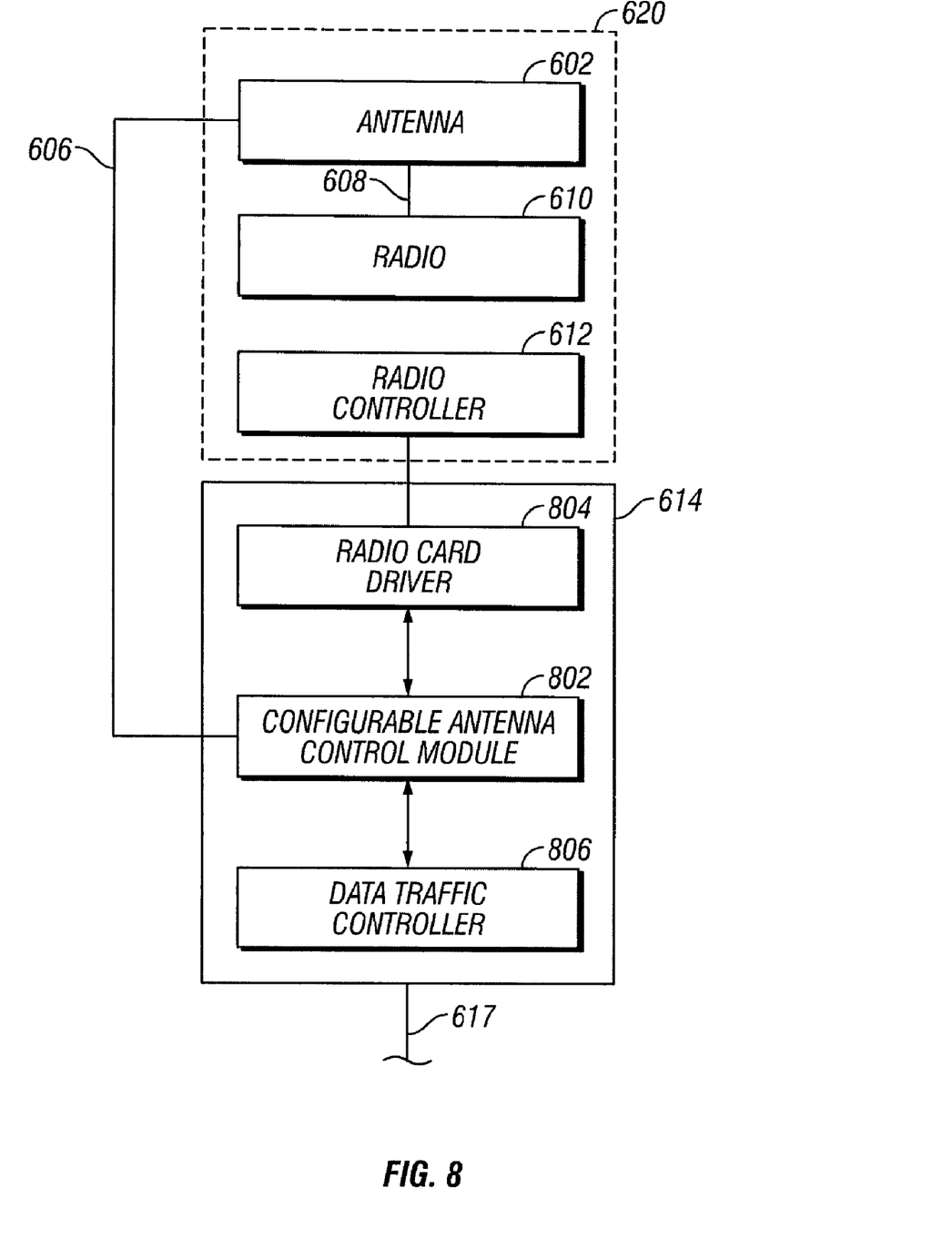
FIG. 8 is a functional block diagram showing the functional elements of FIG. 6 with additional details of the functions of the CPU.

FIG. 8 is a functional block diagram showing the functional elements of FIG. 6 with additional details of the functions of the CPU depicted for an embodiment when the control of the configurable antenna is not tightly integrated with the functions of the radio card 620. A configurable antenna control module (the CAC module) 802 is shown inserted between the radio card driver 804 and the data traffic controller 806. The CAC module 802 provides an interface and control layer between the card driver 804 and the data traffic controller 806.

The CAC module 802 can be thought of as a sort of a packet handler. The CAC module can intercept all incoming and outgoing packets and process them according to the requirements of the methods described above in connection with FIGS. 1-5. The CAC module can modify packets, delay them, change the transmission order, etc. All these actions can be separated into several elementary functions performed on packets (e.g. to send, to put into the queue etc.).

In one embodiment the CAC module 802 performs the following functions:

Transmit-Flow related: receive outgoing packets from the data traffic controller 806; pass outgoing packets (received from the data traffic controller) to the radio card driver 804 in accordance with the desired transmission timing; inform the data traffic controller 806 about the status of sending packets; form proprietary packets for transmission (for example, packets sent as part of the optimization process); pass generated proprietary packets to the radio card driver 804 (for transmission over the air);

Receive-Flow related: receive incoming packets from the radio card driver 804; filter out proprietary incoming packets (received from the radio card driver) and process them (for example, packets having signal quality metric information and responses to polling requests used as part of the optimization process described above); pass incoming data packets (all packets that are not proprietary) to the data traffic controller 806.

Other operations: form/generate antenna control commands according to the methods described in connection with FIGS. 1-5; pass antenna control commands to the configurable antenna system 602 (directly or indirectly); receive commands from the data traffic controller 806 (e.g. configuration options and requests for specific information); and pass specific information (e.g. operation mode related, statistics, etc.) to the data traffic controller 806.

Figure 9:
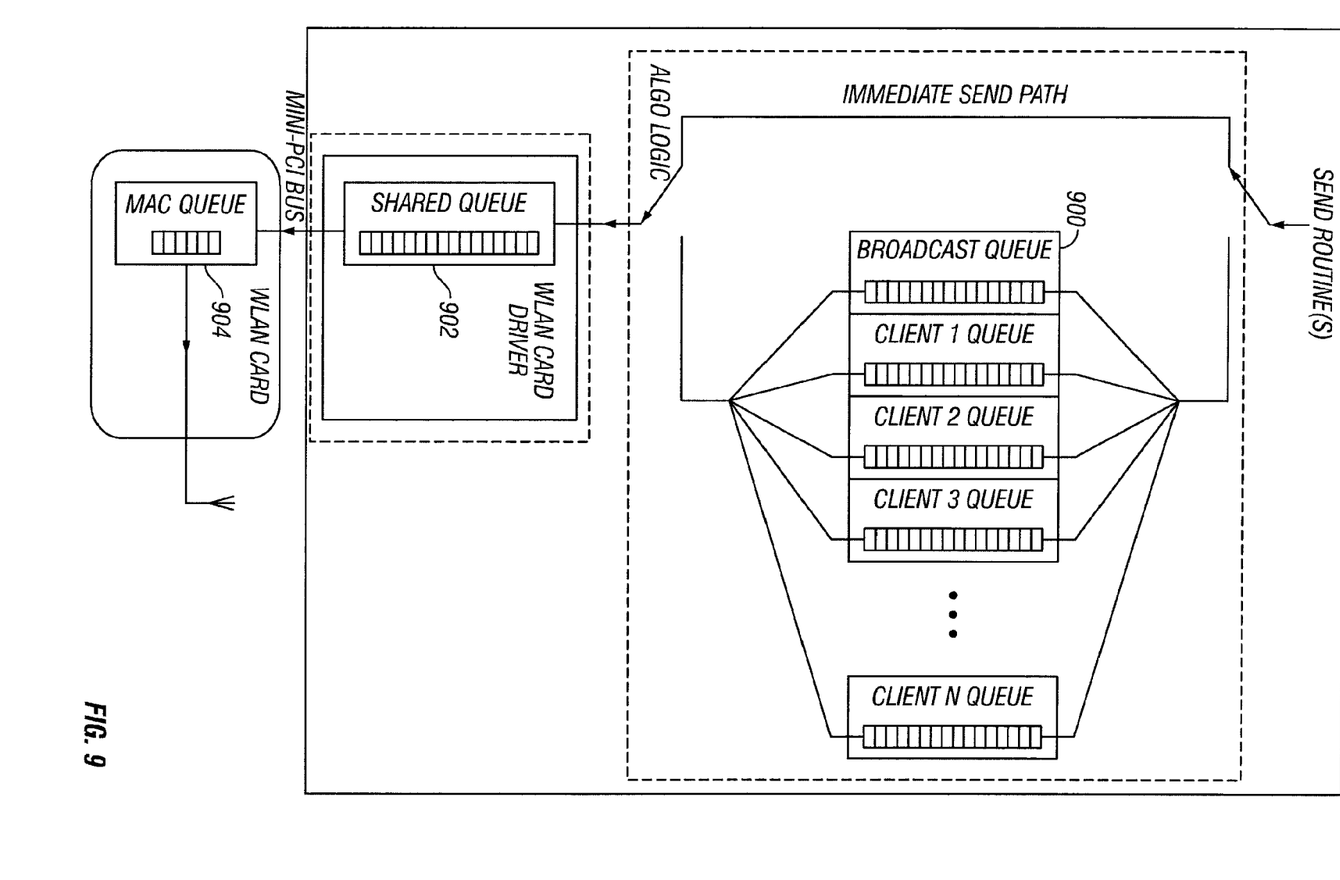
FIG. 9 is a graphical representation of the various queues utilized during the operation of the system depicted in FIG. 8.

FIG. 9 is a graphical representation of the various queues utilized during the operation of the system depicted in FIG. 8. As packets are received by the CPU 614 for transmission via the radio card 620 they are passed from the data traffic controller 806 to the CAC module 802. The shared queue 902 is accessible by the radio card driver 804 and the CAC module 802. For example, the shared queue 902 can be located in the shared memory 616 shown in FIG. 6. The MAC queue 904 is typically located on the radio card 620 and is the location in which packets are stored immediately prior to transmission. The CAC module 802 maintains a series of queues generally indicated as 906. The CAC queues include one queue for each station associated with the wireless device and one queue for packets that are to be broadcast to all stations. Additionally, the CAC module 802 can maintain a queue for one or more multi-cast groups. In general, By careful control of the placing of packets into the shared queue 902, the CAC module can control the timing of the transmission of packets by the radio card 620. That allows the CAC module to coordinate the transmission of packets with its control of the configurable antenna system 602.

When the wireless device has only one associated station, the CAC module sends packets to be transmitted directly into the shared queue without queuing. When the CAC module is optimizing the antenna (described above in connection with FIGS. 1-5) packets are placed into the queue associated with the station until the optimization is finished. When the optimization process is finished, the CAC module sends all of the queued packets to the shared queue 902 for transmission. The radio card driver 804 is responsible for transmitting packets from the shared queue 902 to the radio card 620.

When the wireless device has multiple stations associated or registered, the processing of packets to be transmitted by the CAC module is more complicated. The CAC module decides whether to send an incoming packet to the shared queue 902 or to store it in one of its internal queues 906 utilizing one or more of the following criteria: current antenna position, the best antenna position for the addressee (station) of the packet, link quality to the addressee in the current antenna position and whether there are packets already queued for other stations. Various examples of the operation of the CAC module will now be provided.

In the case when the CAC module has no packets stored in any of its internal queues 906, as a packet for a station is received, it is the immediately sent to the shared queue 902. Additionally as packets are received for a different station which has a signal quality metric that is sufficiently high for the current antenna configuration, those packets would also be immediately transmitted to the shared queue 902 because the antenna will not be reconfigured for the transmission of those packets. However as packets are received for a station which requires reconfiguration of the antenna system for transmission and when the CAC module has not yet received notification that all of the packets in the shared queue have been transmitted, such incoming packets are stored in a queue associated with that station. Once a packet has been placed in one of the internal queues 906, all subsequent packets received by the CAC module are placed into queues, with a separate queue being maintained for each addressee (station). This queuing allows the CAC module to keep the order of the packets as close to the sequence in which they are received by the data traffic controller 806 to minimize the impact on data flow. Once the CAC module receives notification that all of the packets which it has previously placed in the shared queue 902 has been transmitted, the CAC module directs the antenna system 602 to the configuration for the station associated with the packets which had been in a queue the longest. Those packets are then transmitted to the shared queue 902. Additionally packets for stations that can also be transmitted in that same configuration are also transmitted to the shared queue. Once the CAC module receives notification that all of the packets that it has transmitted to the shared queue have been transmitted it then repeats the process for the packets which have been stored in the queue the longest.

What is claimed is:

1. A method of operating a wireless communication device having a configurable antenna system, comprising:
   determining a transmission signal quality metric for a first station with the configurable antenna system in a first receiving configuration;
   determining a transmission signal quality metric for a second station with the configurable antenna system in the first receiving configuration;
   determining a transmission signal quality metric for the first station with the configurable antenna system in a second receiving configuration;
   determining a transmission signal quality metric for the second station with the configurable antenna system in the second receiving configuration;
   selecting an allowable set of antenna receiving configurations for which in each antenna receiving configuration of the allowable set the transmission signal quality metrics for the first station and second station meet a minimum criteria, wherein information transmitted by the first station and second station can be received by the configurable antenna system in the antenna receiving configurations in the allowable set; and
   configuring the configurable antenna system to a single antenna receiving configuration in the allowable set, wherein in this single antenna receiving configuration, the configurable antenna system can receive information from both the first station and the second station having transmission signal quality metrics that meet the minimum criteria, when the wireless communication device is not transmitting.

2. The method of claim 1 wherein determining a transmission signal quality metric for a second station comprises sending a polling request to the second station.

3. The method of claim 1 wherein determining a transmission signal quality metric for a first station comprises sending a polling request to the first station.

4. A wireless communication system comprising:
   a configurable antenna system capable of being selectively configured to create different antenna configurations in response to control signals;
   a radio sub-system in communication with the configurable antenna system and configured to transmit and receive radio signals to and from the configurable antenna system; and
   an antenna controller in communication with the configurable antenna system and configured to
      determine a transmission signal quality metric for each of a plurality of stations with the configurable antenna system in a first configuration,
      determine a transmission signal quality metric for each of the plurality of stations with the configurable antenna system in a second configuration,
      select an allowable set of antenna configurations for receiving from the plurality of stations, for which in each antenna configuration of the allowable set the transmission signal quality metrics meet a minimum criteria for the plurality of stations and where information transmitted by the plurality of stations can be received by the configurable antenna system when it is configured in an antenna configuration in the allowable set, and
      transmit control signals to the configurable antenna system to cause the configurable antenna system to be in a single antenna configuration in the allowable set, wherein in this single antenna configuration, the configurable antenna system can receive information from the plurality of stations having transmission signal quality metrics that meet the minimum criteria, when the wireless communication system is not transmitting.

5. The system of claim 4 wherein the antenna controller is further configured to transmit control signals to the configurable antenna system to cause the configurable antenna system to be in an antenna configuration in the allowable set which has the highest values of the transmission signal quality metric for the plurality of stations to which the wireless communication system is transmitting.

6. The system of claim 4 wherein the radio sub-system comprises a plurality of radios and the configurable antenna system comprises a plurality of configurable antennas with each of the plurality of radios being coupled to one of the plurality of configurable antennas.

7. The system of claim 6 further comprising a signal processing module in communication with the plurality of radios and the antenna controller and configured to provide a transmission signal quality metric for each of the plurality of stations.

8. The method of claim 1 wherein the transmission signal quality metric is selected from the group consisting of the strength of a signal from a station received at the access point, the signal to noise ratio of the signal, and error rates of the signal received.

9. The method of claim 1 further comprising determining an optimal configuration of the antenna system for the first station and determining an optimal configuration of the antenna system for the second station.

10. The method of claim 9 further comprising:
    placing packets to be transmitted into a plurality of queues according to the station they are to be transmitted to;
    selecting one of the plurality of queues for which packets to be transmitted have been received;
    configuring the antenna system to the optimal configuration for the station associated with the selected queue; and
    transmitting a predetermined amount of the packets in the selected queue.

11. The method of claim 9 wherein the optimal configurations are selected from members of the allowable set of antenna configurations.

12. The wireless communication device of claim 4 wherein the transmission signal quality metric is selected from the group consisting the strength of a signal from a station received at the access point, the signal to noise ration of the signal, and error rates of the signal received.

13. The wireless communication device of claim 4 wherein the single antenna configuration is an optimal configuration of the configurable antenna system for the plurality of stations.

14. The wireless communication device of method of claim 13 wherein the optimal configuration is a configuration at which the overall quality of the transmission signal being received by the configurable antenna system is the highest.

15. The method of claim 13 wherein the optimal configuration is selected from members of the allowable set of antenna configurations.

16. A method of operating a wireless communication device having a configurable antenna system, comprising:
configuring the configurable antenna system to an optimal configuration for a first station;
transmitting one or more packets to the first station while the antenna system is configured to the optimal configuration for the first station;
configuring the configurable antenna system to an optimal configuration for a second station;
transmitting one or more packets to the second station while the antenna system is configured to the optimal configuration for the second station;
selecting an allowable set of antenna receiving configurations for the wireless communication device having the configurable antenna system, for which in each antenna receiving configuration of the allowable set signal quality metrics for the first station and second station meet a minimum criteria and such that information transmitted by the first station and second station can be received by the configurable antenna system when it is in one of the antenna receiving configurations in the allowable set; and
configuring the configurable antenna system to a single antenna receiving configuration of the allowable set, wherein in this single antenna receiving configuration, the configurable antenna system can receive information from the first station and the second station having a signal quality metrics that meet the minimum criteria, when the wireless communication device is not transmitting.

17. The method of claim 16 wherein the optimal configurations for the first station and the second station respectively are selected from a set of configurations for which signal quality metrics of the first and second stations meet the minimum criteria.

18. A wireless communication device comprising:
a configurable antenna system capable of being selectively configured to create different antenna configurations in response to control signals;
a radio sub-system in communication with the configurable antenna system and configured to transmit and receive radio signals to and from the configurable antenna system; and
an antenna controller in communication with the configurable antenna system and configured to transmit control signals to the configurable antenna system to cause the configurable antenna system to be in an optimal configuration for a first station;
transmit one or more packets to the first station while the configurable antenna system is configured to the optimal configuration for the first station;
transmit control signals to the configurable antenna system to cause the configurable antenna system to be in an optimal configuration for a second station;
transmit one or more packets to the second station while the configurable antenna system is configured to the optimal configuration for the second station;
select an allowable set of antenna receiving configurations for the configurable antenna system, for which in each antenna receiving configuration of the allowable set signal quality metrics for the first station and second station meet a minimum criteria such that information transmitted by the first station and second station can be received by the configurable antenna system in an antenna receiving configuration of the allowable set; and
transmit control signals to the configurable antenna system to cause the configurable antenna system to be in a single antenna receiving configuration of the allowable set wherein in this single antenna receiving configuration, the configurable antenna system can receive information from the first station and the second station having signal quality metrics that meet the minimum criteria, when the wireless communication device is not transmitting.

19. The device of claim 18 wherein the optimal configurations for the first station and the second station respectively are selected from a set of configurations for which signal quality metrics of the first and second stations meet the minimum criteria.

20. A method of operating a wireless communication device having a configurable antenna system, comprising:
configuring the configurable antenna system in a first receiving configuration for a first station;
measuring a transmission signal quality metric for the first station with the configurable antenna system in the first receiving configuration;
configuring the configurable antenna system in the first receiving configuration for a second station;
measuring a transmission signal quality metric for the second station with the configurable antenna system in the first receiving configuration;
configuring the configurable antenna system in a second receiving configuration for a first station;
measuring a transmission signal quality metric for the first station with the configurable antenna system in the second receiving configuration;
configuring the configurable antenna system in the second receiving configuration for a second station;
measuring a transmission signal quality metric for the second station with the configurable antenna system in the second receiving configuration;
determining whether the first receiving configuration has the transmission signal quality metrics which meets a minimum criteria for the first and second station;
determining whether the second receiving configuration has the transmission signal quality metrics which meet the minimum criteria for the first and second station;
adding receiving configurations which have the transmission signal quality metrics which meet the minimum criteria for the first and second station into a viable set; and
configuring the configurable antenna system to a single receiving configuration in the viable set, wherein in this single receiving configuration, the configurable antenna system can receive information from the first station and the second station having transmission signal quality metrics that meet the minimum criteria, when the wireless communication device is not transmitting.

21. The method of claim 1, wherein the single antenna receiving configuration can be changed over time.

* * * * *